US011154934B2

(12) United States Patent
Strößner et al.

(10) Patent No.: US 11,154,934 B2
(45) Date of Patent: Oct. 26, 2021

(54) BUILD MATERIAL APPLICATION DEVICE

(71) Applicant: CONCEPT LASER GMBH, Lichtenfels (DE)

(72) Inventors: Johannes Strößner, Schwarzenbach/Saale (DE); Martin Pröbstle, Hirschaid (DE); Jochen Mahr, Lichtenfels (DE); Peter Appel, Bamberg (DE)

(73) Assignee: Concept Laser GmbH, Lichtenfels (DE)

(*) Notice: Subject to any disclaimer, the term of this patent is extended or adjusted under 35 U.S.C. 154(b) by 145 days.

(21) Appl. No.: 16/181,196

(22) Filed: Nov. 5, 2018

(65) Prior Publication Data
US 2019/0232369 A1 Aug. 1, 2019

(30) Foreign Application Priority Data

Jan. 26, 2018 (EP) .................................. 18153711

(51) Int. Cl.
*B22F 3/105* (2006.01)
*B22F 12/00* (2021.01)
(Continued)

(52) U.S. Cl.
CPC ............ *B22F 12/00* (2021.01); *B29C 64/153* (2017.08); *B29C 64/214* (2017.08);
(Continued)

(58) Field of Classification Search
CPC ... B29C 64/214; B29C 64/264; B29C 64/153; B29C 64/245; B29C 64/227;
(Continued)

(56) References Cited

U.S. PATENT DOCUMENTS

2008/0156263 A1* 7/2008 Montero-Escuder ....................... B22F 3/1055
118/695
2015/0367415 A1 12/2015 Buller et al.
(Continued)

FOREIGN PATENT DOCUMENTS

CL WO2017/157648 A1 9/2017
CN 107206679 A 9/2017
(Continued)

OTHER PUBLICATIONS

European Search Report Corresponding to Application No. 18153711 dated Jul. 5, 2018.
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Build material application device (5) for an apparatus (1) for additively manufacturing at least one three-dimensional object (2) by means of successive layerwise selective irradiation and consolidation of layers of build material (3) which can be consolidated by means of at least one energy beam (4), the build material application device (5) comprising: —at least one build material application element (8) configured to apply an amount of build material (3) in a build plane (E) of a respective apparatus (1) for additively manufacturing at least one three-dimensional object (2); —at least one spatter removal element (9) configured to remove spatters (10) present in a layer of build material (3) of a respective apparatus (1) for additively manufacturing a three-dimensional object (2), particularly to remove spatters (10) originating from a selective irradiation of the respective layer of build material (3).

13 Claims, 3 Drawing Sheets

(51) Int. Cl.
*B33Y 10/00* (2015.01)
*B33Y 30/00* (2015.01)
*B33Y 40/00* (2020.01)
*B29C 64/214* (2017.01)
*B29C 64/227* (2017.01)
*B29C 64/153* (2017.01)
*B29C 64/264* (2017.01)
*B29C 64/30* (2017.01)
*B29C 64/245* (2017.01)
*B22F 10/10* (2021.01)
*B22F 10/28* (2021.01)
*B22F 10/00* (2021.01)
*B22F 10/20* (2021.01)
*B22F 10/50* (2021.01)

(52) U.S. Cl.
CPC .......... *B29C 64/227* (2017.08); *B29C 64/245* (2017.08); *B29C 64/264* (2017.08); *B29C 64/30* (2017.08); *B33Y 10/00* (2014.12); *B33Y 30/00* (2014.12); *B33Y 40/00* (2014.12); *B22F 10/00* (2021.01); *B22F 10/10* (2021.01); *B22F 10/20* (2021.01); *B22F 10/28* (2021.01); *B22F 10/50* (2021.01)

(58) Field of Classification Search
CPC ......... B29C 64/30; B29C 64/35; B33Y 10/00; B33Y 30/00; B33Y 40/00; B22F 3/008; B22F 3/1055; B22F 2003/1056; B22F 2003/1059; B22F 10/00; B22F 10/10; B22F 10/20; B22F 10/28; B22F 10/50

USPC .............................................. 425/174.4, 375
See application file for complete search history.

(56) References Cited

U.S. PATENT DOCUMENTS

2017/0326792 A1    11/2017    Paternoster et al.
2019/0061242 A1 *   2/2019    Herzog ................ B29C 64/268
2019/0366433 A1 * 12/2019    Aydin .................. B22F 3/1055

FOREIGN PATENT DOCUMENTS

| CN | 107428083 A | 12/2017 | |
| DE | 19905067 A1 | 8/2000 | |
| DE | 102013221014 A1 | 4/2015 | |
| EP | 1439050 A1 | 7/2004 | |
| EP | 3466566 A1 | 4/2019 | |
| JP | 2016/056417 A | 4/2016 | |
| JP | 2017/214611 A | 12/2017 | |
| WO | WO-2017157648 A1 * | 9/2017 | ........... B29C 64/209 |
| WO | WO2017/201120 A1 | 11/2017 | |

OTHER PUBLICATIONS

European Search Opinion Corresponding to Application No. 18153711 dated Aug. 9, 2018.
Machines Translated Japanese Office Action Corresponding to Application No. 2018129662 dated Sep. 6, 2019.
Combined Search Report and Office Action Corresponding to Application No. 201910208457 on Sep. 28, 2020.
European Office Action Corresponding to Application No. 18153711 on May 13, 2020.

* cited by examiner

BUILD MATERIAL APPLICATION DEVICE

CROSS-REFERENCE TO RELATED APPLICATIONS

This application claims priority to European Patent Application serial no. 18 153 711.9 filed Jan. 26, 2018, the contents of which is incorporated herein by reference in its entirety as if set forth verbatim.

FIELD OF THE INVENTION

The invention relates to a build material application device for an apparatus for additively manufacturing at least one three-dimensional object by means of successive layerwise selective irradiation and consolidation of layers of build material which can be consolidated by means of at least one energy beam.

BACKGROUND

Build material application devices for respective apparatuses for additively manufacturing three-dimensional objects are generally known from the technological field of additive manufacturing. Respective build material application devices are configured to apply an amount of build material in a build plane of a respective apparatus for additively manufacturing three-dimensional objects.

The quality of an applied build material layer significantly depends on the presence of spatters in the previous build material layer(s). Spatters—sometimes also denoted as weld spatters—are typically built by non-consolidated build material agglomerates, residues, etc. originating from the irradiation of the previous build material layer(s). Spatters are typically coarser than the initial build material which is to be applied in the build plane. In some cases, spatters can also have different chemical properties compared with the initial build material.

The presence of spatters is challenging since spatters may lead to inhomogeneities while applying a build material layer and/or inhomogeneities in an applied build material layer which may compromise the melting and consolidation behavior of the respective build material layer. As a consequence, spatters may compromise the quality of the additive manufacturing process, particularly the quality of the consolidation of build material, and the object manufactured by the process, respectively.

Since the formation of spatters can be hardly avoided, it is of great significance to provide appropriate approaches allowing for a highly efficient and integrated removal of respective spatters.

It is thus, the object of the invention to provide a build material application device allowing for a highly efficient and integrated removal of respective spatters.

This object is achieved by a build material application device according to Claim 1. The claims depending on Claim 1 relate to possible embodiments of the build material application device according to Claim 1.

The build material application device described herein is configured to apply an amount, particularly a specific amount, of build material in a build plane of an apparatus for additively manufacturing three-dimensional objects ("apparatus") by means of successive layerwise selective irradiation and resulting consolidation of layers of build material which can be consolidated by means of at least one energy beam. Thus, the build material application device is typically allocated to a respective apparatus. By applying an amount of build material—which can be a powder, particularly a metal powder—in a build plane of a respective apparatus, a build material layer is formed, which build material layer is to be selectively irradiated and consolidated during operation of the apparatus. Thus, the build material application device is configured to apply an amount of build material in a build plane of an apparatus so as to form a build material layer which is to be selectively irradiated and consolidated during operation of the apparatus. This build material application process is repeated several times during operation of the apparatus.

The build material application device comprises at least one build material application element. The build material application element is configured to apply an amount of build material in a build plane of a respective apparatus.

The build material application device further comprises at least one spatter removal element. The spatter removal element is configured to remove spatters present in at least one layer of build material of a respective apparatus. Respective spatters typically originate from the selective irradiation of the respective layer of build material. The spatters—which are sometimes also denoted as weld spatters—are typically built by non-consolidated build material agglomerates, residues, etc. originating from the irradiation of the respective build material layer(s).

Since the build material application device comprises both a respective build material application element and a respective spatter removal element, the build material application device comprises both a build material application functionality and a spatter removal functionality. The build material application device thus, allows for both applying build material and removing spatters. The build material application device thus, allows for a highly efficient and integrated removal of respective spatters.

As will be more apparent from below, the build material application element and the spatter removal element are arranged in such a manner relative to each other that during operation of the build material application device, first respective spatters are removed from a previously selectively irradiated and consolidated build material layer by the spatter removal element before an amount of (fresh) build material is applied to this build material layer so as to form a new build material layer which is to be selectively irradiated and consolidated on the previously selectively irradiated and consolidated build material layer.

The build material application device is typically moveably supported in at least one motion path relative to the build plane of the apparatus, the build material application device is allocated to, i.e. particularly across the build plane of the apparatus, the build material application device is allocated to. The at least one motion path may be a translatory motion path, for instance. When the build material application device is moved in the at least one motion path, the spatter removal element is typically moved across the build plane of the apparatus, the build material application device is allocated to. Thus, when moving the build material application device in the at least one motion path, the spatter removal element is typically moved across the build plane so that it is possible to remove spatters from a previously selectively irradiated and consolidated build material layer. Likewise, when the build material application device is moved in the at least one motion path, the build material application element is typically moved across the build plane of the apparatus, the build material application device is allocated to. Hence, when moving the build material application device in the at least one motion path, the build material application element is typically moved across the build plane so that it is possible to apply an amount of build material in the build plane and possible to form a new build material layer which is to be selectively irradiated and consolidated on the previously selectively irradiated and consolidated build material layer. The at least one motion path may thus, be deemed or denoted as a combined spatter removal and build material application path in which spatters are removed from a previously selectively irradiated and consolidated build material layer and in which (fresh) build material is applied on the previously selectively irradiated and consolidated build material layer so as to form a new build material layer which is to be selectively irradiated and consolidated on the previously selectively irradiated and consolidated build material layer.

SUMMARY OF THE INVENTION

According to an exemplary embodiment, the build material application element may be built as or comprise a re-coating element, e.g. a re-coating blade. Hence, the build material application device may be built as a re-coating device, comprising at least one build material application element being built as a re-coating element, particularly a re-coating blade, or comprising a re-coating element, particularly a re-coating blade. Yet, other embodiments of the at least one build material application element are conceivable; as such, the build material application element may be built as or comprise a build material containment or reservoir having at least one, particularly gate-like, opening through which build material may exit the containment or reservoir so as to apply an amount of build material in the build plane of a respective apparatus; the at least one opening being closeable by at least one closing element assigned to the at least one opening, the closing element being moveably supported between an open position, in which applying an amount of build material through the at least one opening in the build plane of the apparatus is possible, and a closed position, in which applying an amount of build material through the at least one opening in the build plane of the apparatus is not possible.

According to an exemplary embodiment, the spatter removal element may be built as or comprise at least one spatter removal blade element, particularly a flexible spatter removal blade element. The spatter removal blade element is designed in such a manner that it allows for removing spatters from a build material layer. The concrete geometric dimensions and arrangement of a respective spatter removal blade element may thus, be adapted to the typical size of spatters which are to be removed so that an efficient removal of respective spatters by means of a respective spatter removal blade element is feasible. The spatter removal blade element may be formed of a flexible material, e.g. an elastomer material, so as to avoid that the spatter removal blade element may negatively affect the formation of a new build material layer, e.g. by negatively affecting the surface of a previously selectively irradiated and consolidated build material layer.

According to another exemplary embodiment, the spatter removal element may be built as or comprise a spatter removal doctor's blade or wiper element. The spatter removal doctor's blade or wiper element is designed in such a manner that it allows for removing spatters from a build material layer. The concrete geometric dimensions and arrangement of a respective spatter removal doctor's blade or wiper element may thus, be adapted to the typical size of spatters which are to be removed so that an efficient removal of respective spatters by means of a respective spatter removal doctor's blade or wiper element is feasible. The spatter removal doctor's blade or wiper element may be formed of a flexible material, e.g. an elastomer material. The above annotations regarding the exemplary embodiment of a spatter removal blade element apply in analogous manner.

According to another exemplary embodiment, the spatter removal element may be built as or comprise a spatter removal brush or rake element comprising a plurality of brush or rake elements in a defined spatial arrangement. The spatter removal brush or rake element is designed in such a manner that it allows for removing spatters from a build material layer. The concrete geometric dimensions and arrangement of a respective spatter removal brush or rake element, particularly respective brush or rake elements, may thus, be adapted to the typical size of spatters which are to be removed so that an efficient removal of respective spatters by means of a respective spatter removal brush or rake element is feasible. The brush or rake elements may be formed of a flexible material, e.g. an elastomer material. The above annotations regarding the exemplary embodiment of a spatter removal blade element apply in analogous manner.

According to another exemplary embodiment, the spatter removal element may be built as or comprise a spatter removal blowing or sucking element, particularly a blowing or sucking nozzle element. The spatter removal blowing or sucking element may thus, be configured to effect a blowing or sucking stream acting upon respective spatters and allowing for a removal of the spatters. In order to concertedly direct a respective blowing or sucking stream towards the spatters, the spatter removal blowing or sucking element may be provided with nozzle elements which can be oriented towards the respective build material layer from which respective spatters are to be removed. The spatter removal blowing or sucking element may thus, comprise or be connected with a stream generating unit, e.g. a blowing or sucking pumping unit, configured to generate a respective blowing or sucking stream. A respective blowing or sucking stream may be an (inert) gas stream.

According to another exemplary embodiment, the spatter removal element may be built as or comprise a spatter removal vibrational element, particularly an ultrasonic vibrational element, e.g. an ultrasonic transducer. The spatter removal element may thus, be configured to effect (mechanical) vibrations acting upon respective spatters and allowing for loosening of spatters, which may be mechanically interconnected with each other or a part of the three-dimensional object which is to be additively manufactured, from the respective build material layer before removing the spatters from the build material layer. The spatter removal element may thus, comprise or be connected with a vibration generating unit, e.g. an ultrasonic generating unit, configured to generate a respective (mechanical) vibrations.

Of course, any combinations of respective exemplary embodiments of spatter removal elements are conceivable. As an example, a spatter removal element in the shape of a spatter removal blade element may be combined with a spatter removal element in the shape of a spatter removal vibrational element.

The build material application device may comprise a supporting construction or structure, respectively. The supporting construction or structure, respectively may be built as or comprise a supporting frame, for instance. The supporting construction may comprise at least one supporting site for supporting the at least one build material application element and at least one supporting site for supporting the at least one spatter removal element. The supporting construction is thus, to be deemed as a structural element or group of structural elements which connect(s) and (mechanically) couple(s) the build material application element and the spatter removal element. The connection between a respective supporting site and the build material application element or spatter removal element, respectively may be a mechanical connection. A respective supporting site may allow for a detachable connection between the supporting construction and the build material application element or spatter removal element, respectively. As an example, a respective build material application element or spatter removal element, respectively may be connected with a respective supporting site via a bolted connection. A respective supporting site may thus, be built as or comprise a bore for receiving bolts, screws, etc. Yet, other connection types, such as latching connections, are conceivable as well.

According to a first exemplary configuration, the supporting construction may comprise a base body, a first, particularly arm-like, extension extending off the base body in a defined relationship, particularly in a perpendicular angle, relative to the base body, and at least one second, particularly arm-like, extension extending off the base body in a defined relationship, particularly in a perpendicular angle, relative to the base body. In this exemplary configuration, the supporting site for supporting the at least one build material application element is typically provided with the first extension and the supporting site for supporting the at least one spatter removal element is typically provided with the at least one second extension.

According to another exemplary configuration, the supporting construction comprises a base body, a first, particularly arm-like, extension extending off the base body in a defined relationship, particularly in a perpendicular angle, relative to the base body, a second, particularly arm-like, extension extending off the base body in a defined relationship, particularly in a perpendicular angle, relative to the base body, and a third, particularly arm-like, extension extending off the base body in a defined spatial relationship, particularly in a perpendicular angle, relative to the base body. In this exemplary configuration, the supporting site for supporting the at least one build material application element is typically provided with the second extension, a first supporting site for supporting a first spatter removal element is typically provided with the first extension, and a second supporting site for supporting a second spatter removal element is typically provided with the third extension.

The extensions being provided with the supporting site for supporting a spatter removal element may each be moveably supported relative to the base body and/or relative to each other in at least one degree of freedom of motion, which may e.g. be a translatory and/or rotatory (pivotable) degree of freedom of motion, between an operating position, in which a removal of spatters is possible via the respective the spatter removal element, and a non-operating position, in which a removal of spatters via the respective the spatter removal element is not possible. This particularly, allows that one spatter removal element may be in an operating position, while the other spatter removal is in a non-operating position.

As is apparent from above, a respective extension may form part of the build material application element and/or the spatter removal element, respectively. Likewise, the build material application element and/or the spatter removal element may form part of a respective extension.

In any case, the base body and the extensions may each have a longitudinal geometric shape. The base body may be arranged in a parallel arrangement relative to the build plane of the apparatus, the build material application device is allocated to. The extensions may be arranged in an angled, particularly perpendicular, arrangement relative to the build plane of the apparatus, the build material application device is allocated to. The extensions may be arranged in a parallel or essentially parallel arrangement.

At least for the first exemplary configuration of only one spatter removal element, the at least one second extension is typically arranged in front of the first extension with respective to a given motion of the supporting construction in a respective motion path of the supporting construction relative to the build plane of the apparatus, the build material application device is allocated to, i.e. particularly across the build plane of the apparatus, the build material application device is allocated to, for applying an amount of build material so as to form a new build material layer.

As mentioned above, the build material application device is typically moveably supported in at least one motion path relative to the build plane of the apparatus, the build material application device is allocated to, i.e. particularly across the build plane of the apparatus, the build material application device is allocated to. As such, the supporting construction may be moveably supported in at least one degree of freedom of motion relative to the build plane of the apparatus, the build material application device is allocated to, i.e. particularly across the build plane of the apparatus, the build material application device is allocated to. The build material application device may comprise a drive unit, e.g. a motor, allowing for generating a drive force which moves the supporting construction in the respective motion path.

The invention further relates to an apparatus for additively manufacturing for additively manufacturing at least one three-dimensional object, e.g. a technical component, by means of successive layerwise selective irradiation and consolidation of layers of build material which can be consolidated by means of at least one energy beam. The build material may comprise at least one of a metal powder, a ceramic powder, or a polymer powder, for instance. The energy beam may be an electron beam or a laser beam, for instance. The apparatus can be a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

The apparatus comprises a number of functional and/or structural devices which are operable or operated during its operation. Each functional and/or structural device may comprise a number of functional and/or structural units. Exemplary functional and/or structural devices are the build material application device which is configured to apply an amount build material which is to be selectively irradiated and consolidated in the build plane of the apparatus and an irradiation device which is configured to selectively irradiate and thereby, consolidate portions of a layer of build material with at least one energy beam. Since the apparatus comprises at least one build material application device as specified herein, all annotations concerning the build material application device also apply to the apparatus.

The invention also relates to a method for removing spatters from a layer of build material in a build plane of an apparatus for additively manufacturing a three-dimensional object, particularly spatters originating from selective irradiation of a layer of build material, and applying a layer of build material. According to the method, removing of spatters and applying a layer of build material is performed (essentially) simultaneously by means of a build material application device as specified herein. In other words, a build material application device as specified herein is used for implementing the method. Since the method is implemented by means of at least one build material application device as specified herein, all annotations concerning the build material application device also apply to the method.

BRIEF DESCRIPTION OF THE DRAWINGS

Exemplary embodiments of the invention are described with reference to the Fig., whereby.

DETAILED DESCRIPTION

Figure 1:
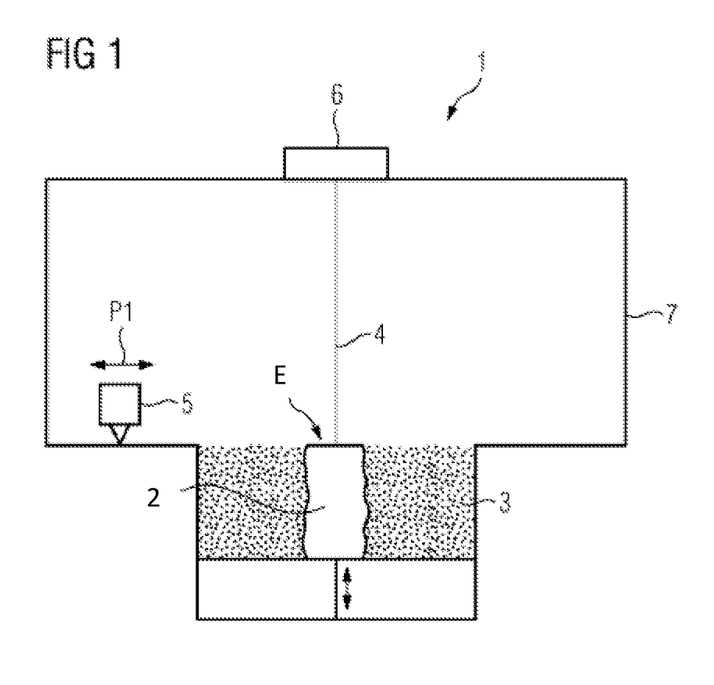
FIG. 1 shows a principle drawing of an apparatus for additively manufacturing of three-dimensional objects according to an exemplary embodiment.

FIG. 1 shows a principle drawing of an exemplary embodiment of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of at least one energy beam 4 according to an exemplary embodiment. The energy beam 4 may be an electron beam or a laser beam, for instance. The apparatus 1 may thus, be embodied as a selective electron beam melting apparatus or as a selective laser melting apparatus, for instance.

The apparatus 1 comprises a number of functional and/or structural devices which are operable and operated during its operation. Each functional and/or structural device may comprise a number of functional and/or structural units. Operation of the functional and/or structural devices and the apparatus 1, respective is controlled by a (central) control device (not depicted).

Exemplary functional and/or structural devices of the apparatus 1 are an irradiation device 6 and a build material application device 5.

The irradiation device 6 is configured to selectively irradiate and consolidate portions of layers of build material 3 with at least one energy beam 4 during the additive build-up of the object 2. The irradiation device 6 may comprise a beam generating unit (not shown) configured to generate at least one energy beam 4 and a beam deflecting unit (not shown), e.g. a scanning unit, configured to deflect an energy beam 4 to diverse positions within the build plane E of the apparatus 1.

The build material application device 5 is configured to apply an amount, particularly a specific amount, of build material 3, which may be supplied from a build material supplying device (not shown), such as a dose module, for instance, in the build plane E of the apparatus 1. By applying an amount of build material 3 in the build plane E of the apparatus 1, a build material layer is formed, which build material layer is to be selectively irradiated and consolidated during operation of the apparatus 1. The build material application device 5 is thus, configured to apply an amount of build material 3 in the build plane E of the apparatus 1 so as to form a build material layer which is to be selectively irradiated and consolidated during operation of the apparatus 1. This build material application process is repeated several times during operation of the apparatus 1.

As indicated by the double-arrow P1, the build material application device 5 is moveably supported within the process chamber 7 of the apparatus 1.

Figure 2:
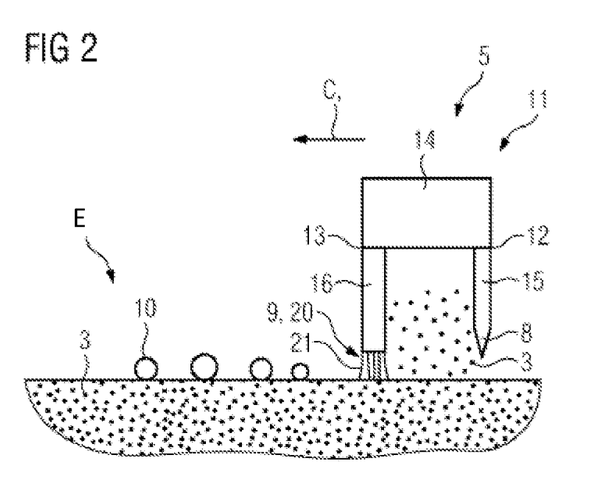
FIG. 2-5 each show a principle drawing of a build material application device according to an exemplary embodiment.
Figure 3:
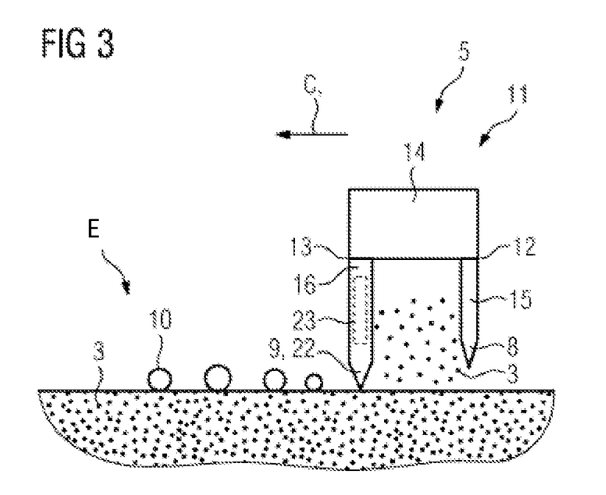
Figure 4:
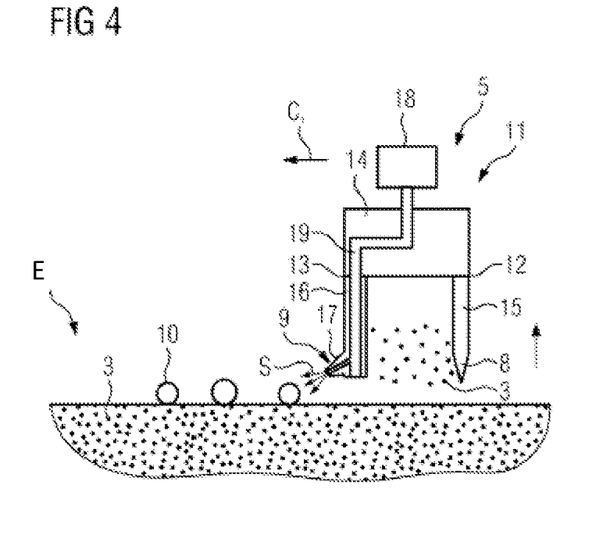

FIG. 2-4 each show exemplary embodiments of the build material application device 5. In any case, the build material application device 5 comprises at least one build material application element 8 and at least one spatter removal element 9. The build material application element 8 is configured to apply an amount of build material 3 the build plane E of the apparatus 1. The spatter removal element 9 is configured to remove spatters 10 present in a respective layer of build material 3. Respective spatters 10 typically originate from the selective irradiation of the respective layer of build material 3. The spatters 10—which are sometimes also denoted as weld spatters—are typically built by non-consolidated build material agglomerates, residues, etc. originating from the irradiation of the respective build material layer(s).

Since the build material application device 5 comprises both the build material application element 8 and the spatter removal element 9, the build material application device 5 comprises both a build material application functionality and a spatter removal functionality. The build material application device 5 thus, allows for both applying build material and removing spatters 10. The build material application device 5 thus, allows for a highly efficient and integrated removal of respective spatters 10.

As indicated by double-arrow P1 in FIG. 1, the build material application device 5 is moveably supported in at least one motion path relative to the build plane E of the apparatus 1, i.e. particularly across the build plane E of the apparatus 1. The at least one motion path may be a translatory motion path, for instance. When the build material application device 5 is moved in the at least one motion path, the spatter removal element 9 is moved across the build plane E of the apparatus 1. Thus, when moving the build material application device 5 in the at least one motion path, the spatter removal element 9 is moved across the build plane E so that it is possible to remove spatters 10 from a (previously selectively irradiated and consolidated) build material layer. Likewise, when the build material application device 5 is moved in the at least one motion path, the build material application element 8 is moved across the build plane E of the apparatus 1. Hence, when moving the build material application device 5 in the at least one motion path, the build material application element 8 is moved across the build plane E so that it is possible to apply an amount of build material 3 in the build plane E and possible to form a new build material layer which is to be selectively irradiated and consolidated on the previously selectively irradiated and consolidated build material layer. The at least one motion path may thus, be deemed or denoted as a combined spatter removal and build material application path in which spatters 10 are removed from a previously selectively irradiated and consolidated build material layer and in which (fresh) build material 3 is applied on the previously selectively irradiated and consolidated build material layer so as to form a new build material layer which is to be selectively irradiated and consolidated on the previously selectively irradiated and consolidated build material layer.

The coating direction, i.e. the direction in which the build material application device 5 is moved for applying an amount of build material 3 so as to form a new build material layer which is to be selectively irradiated and consolidated on the previously selectively irradiated and consolidated build material layer, is indicated by the arrow(s) CD in FIG. 2-4.

As is apparent from FIG. 2-4 each showing an exemplary embodiment of a build material application device 5, the build material application element 8 and the spatter removal element 9 are arranged in such a manner relative to each other that during operation of the build material application device 5, first respective spatters 10 are removed from a previously selectively irradiated and consolidated build material layer by the spatter removal element 9 before an amount of (fresh) build material 3 is applied to this build material layer so as to form a new build material layer which is to be selectively irradiated and consolidated on the previously selectively irradiated and consolidated build material layer.

According to the exemplary embodiments given in FIG. 2-4, the build material application element 8 is built as a re-coating element, e.g. a re-coating blade. Hence, the build material application device 5 is built as a re-coating device, comprising at least one build material application element 8 being built as a re-coating element, particularly a re-coating blade. Yet, even if not depicted in the Fig., other embodiments of the build material application element 8 are conceivable; as such, the build material application element 8 may be built as a build material containment or reservoir having at least one, particularly gate-like, opening through which build material 3 may exit the containment or reservoir so as to apply an amount of build material 3 in the build plane E of the apparatus 1. A respective opening may be closeable by a closing element assigned to the at least one opening. A respective closing element may be moveably supported between an open position, in which applying an amount of build material 3 through the opening in the build plane E of the apparatus 1 is possible, and a closed position, in which applying an amount of build material 3 through the opening in the build plane E of the apparatus 1 is not possible.

According to the exemplary embodiment of FIG. 2, the spatter removal element 9 is built as a spatter removal brush or rake element 20 comprising a plurality of brush or rake elements 21 in a defined spatial arrangement. The spatter removal brush or rake element 20 is designed in such a manner that it allows for removing spatters 10 from a build material layer. The concrete geometric dimensions and arrangement of the spatter removal brush or rake element 20, particularly respective brush or rake elements 21, is thus, adapted to the typical size of spatters 10 which are to be removed so that an efficient removal of respective spatters 10 by means of the spatter removal brush or rake element 20 is feasible. The brush or rake elements 21 may be formed of a rigid material, e.g. a metal, and/or a flexible material, e.g. an elastomer material.

FIG. 2 further shows that the build material application device 5 may comprise a supporting construction 11. The supporting construction 11 may be built as or comprise a supporting frame. The supporting construction 11 comprises at least one supporting site for supporting the build material application element 8 and a supporting site for supporting the spatter removal element 9. The supporting construction 11 is thus, to be deemed as a structural element or group of structural elements which connect(s) and (mechanically) couple(s) the build material application element 8 and the spatter removal element 9. The connection between a respective supporting site 12, 13 and the build material application element 8 or spatter removal element 9, respectively may be a mechanical connection. A respective supporting site 12, 13 may allow for a detachable connection between the supporting construction 11 and the build material application element 8 or spatter removal element 9, respectively. As an example, a respective build material application element 8 or spatter removal element 9, respectively may be connected with a respective supporting site 12, 13 via a bolted connection. A respective supporting site 12, 13 may thus, be built as or comprise a bore (not shown) for receiving bolts, screws, etc. Yet, other connection types, such as latching connections, are conceivable as well.

As mentioned above, the build material application device 5 is moveably supported in at least one motion path relative to the build plane E of the apparatus 1, i.e. particularly across the build plane E of the apparatus 1. As such, the supporting construction 11 may be moveably supported in at least one degree of freedom of motion relative to the build plane E of the apparatus 1, i.e. particularly across the build plane E of the apparatus 1. The build material application device 5 may comprise a drive unit (not shown), e.g. a motor, allowing for generating a drive force which moves the supporting construction 11 in the respective motion path.

According to the configuration of the exemplary embodiment of FIG. 2, the supporting construction 11 comprises a base body 14, a first arm-like extension 15 extending off the base body 14 in a defined relationship, particularly in a perpendicular angle, relative to the base body 14, and a second arm-like extension 16 extending off the base body 14 in a defined relationship, particularly in a perpendicular angle, relative to the base body 14. In this exemplary configuration, the supporting site 12 for supporting the build material application element 8 is typically provided with the first extension 15 and the supporting site 13 for supporting the spatter removal element 9 is typically provided with the second extension 16.

In the exemplary configuration of FIG. 2, the second extension 16 is arranged in front of the first extension 15 with respective to a given motion (see arrow CD) of the supporting construction 11 in a respective motion path relative to the build plane E of the apparatus 1, i.e. particularly across the build plane E of the apparatus 1, for applying an amount of build material 3 so as to form a new build material layer.

According to the exemplary embodiment of FIG. 3, the spatter removal element 9 is built as a spatter removal blade element 22. The spatter removal blade element 22 is designed in such a manner that it allows for removing spatters 10 from a build material layer. The concrete geometric dimensions and arrangement of the spatter removal blade element 22 is thus, adapted to the typical size of spatters 10 which are to be removed so that an efficient removal of respective spatters 10 by means of the spatter removal blade element 22 is feasible. The spatter removal blade element 22 may be formed of a flexible material, e.g. an elastomer material.

According to the exemplary embodiment of FIG. 4, the spatter removal element 9 is built as a a spatter removal blowing or sucking element 17. The spatter removal element 9 is thus, configured to effect a blowing or sucking stream acting upon respective spatters 10 and allowing for a removal of the spatters 10. In order to concertedly direct a respective blowing or sucking stream (as indicated by arrows S) towards the spatters 10. The spatter removal blowing or sucking elements 17 may be provided with nozzle elements which can be oriented towards the respective build material layer from which respective spatters 10 are to be removed. The spatter removal blowing or sucking element 17 may comprise or—via a streaming channel structure 19—be connected with a stream generating unit 18, e.g. a blowing or sucking pumping unit, configured to generate a respective blowing or sucking stream. A respective blowing or sucking stream may be an (inert) gas stream.

Other possible embodiments of a respective spatter removal element 9, which are not depicted in separate embodiments, are a spatter removal vibrational element 23 (see FIG. 3), particularly an ultrasonic vibrational element, e.g. an ultrasonic transducer. The spatter removal vibrational element 23 is thus configured to effect (mechanical) vibrations acting upon respective spatters 10 and allowing for loosening of spatters 10, which may be mechanically interconnected with each other or a part of the three-dimensional object 2 which is to be additively manufactured, from the respective build material layer before removing the spatters 10 from the build material layer. The spatter removal vibrational element 23 may thus, comprise or be connected with a vibration generating unit, e.g. an ultrasonic generating unit, configured to generate a respective (mechanical) vibrations.

Of course, any combinations of respective exemplary embodiments of spatter removal elements 9 are conceivable. As is indicated in FIG. 3, a spatter removal element 9 in the shape of a spatter removal blade element 22 may be combined with a spatter removal element in the shape of a spatter removal vibrational element 23, for instance.

Figure 5:
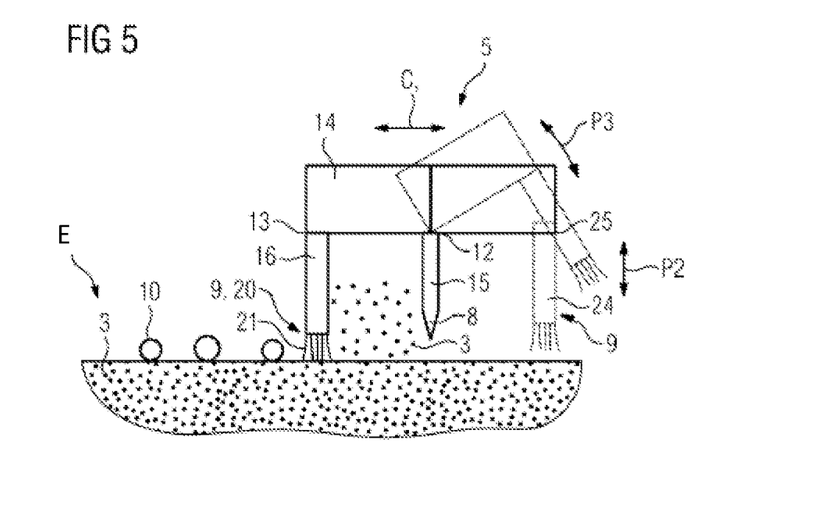

According to the exemplary embodiment of FIG. 5, the supporting construction 11 comprises a base body 14, a first arm-like extension 15 extending off the base body 14 in a defined relationship, particularly in a perpendicular angle, relative to the base body 14, a second particularly arm-like extension 16 extending off the base body 14 in a defined relationship, particularly in a perpendicular angle, relative to the base body 14, and a third arm-like extension 24 extending off the base body 14 in a defined spatial relationship, particularly in a perpendicular angle, relative to the base body 14. In this configuration, the supporting site 12 for supporting the build material application element 8 is provided with the first extension 15, a first supporting site 13 for supporting a first spatter removal element 9 is provided with the second extension 16, and a second supporting site 25 for supporting a second spatter removal element 9 is provided with the third extension 24.

As is indicated by the dotted lines, the extension 24 (the same could apply to extension 16) being provided with the supporting sites 25 for supporting a spatter removal element 9 may each be moveably supported relative to the base body 14 and/or relative to each other in at least one degree of freedom of motion, which may e.g. be a translatory degree of freedom of motion (indicated by double-arrow P2) and/or rotatory (pivotable) degree of freedom of motion (indicated by double-arrow P3), between an operating position (see FIG. 5, left), in which a removal of spatters 10 is possible via the respective the spatter removal element 9, and a non-operating position (see FIG. 5, right), in which a removal of spatters 10 via the respective the spatter removal element 9 is not possible. This allows that one spatter removal element 9 may be in an operating position, while the other spatter removal is in a non-operating position.

As is apparent from FIG. 2-5, the base body 14 and the extensions 15, 16, 24 may each have a longitudinal geometric shape. The base body 14 may be arranged in a parallel arrangement relative to the build plane E of the apparatus 1. The extensions 15, 16, 24 may be arranged in an angled, particularly perpendicular, arrangement relative to the build plane E of the apparatus 1. The extensions 15, 16, 24 may be arranged in a parallel or essentially parallel arrangement.

The apparatus 1 allows for implementing a method for removing spatters 10 from a layer of build material 3 in a build plane E of an apparatus 1 for additively manufacturing a three-dimensional object 2 and applying a layer of build material 3. According to the method, removing of spatters 10 and applying a (new) layer of build material 3 is performed (essentially) simultaneously by means of a respective build material application device 5.

The invention claimed is:

1. A build material application device for an apparatus for additively manufacturing at least one three-dimensional object, the build material application device comprising:
   at least one build material application element;
   a plurality of spatter removal elements; and,
   a supporting construction comprising:
      a base body;
      a first supporting site comprising a first extension extending from the base body and supporting the at least one build material application element;
      a second supporting site comprising a second extension extending from the base body and supporting a first one of the plurality of spatter removal elements; and
      a third extension extending off the base body and supporting a second one of the plurality of spatter removal elements;
      wherein, at least one of the first extension, second extension and third extension are moveably supported relative to the base body and/or each other in at least one rotatory degree of freedom into a non-operating state wherein the at least one of the first extension, second extension and third extension do not contact the plurality of spatter removal elements.

2. The build material application device of claim 1, wherein the at least one build material application element comprises a re-coating element.

3. The build material application device of claim 1, wherein at least one of the plurality of spatter removal elements comprises a spatter removal blade.

4. The build material application device of claim 1, wherein at least one of the plurality of spatter removal elements comprises a wiper element.

5. The build material application device of claim 1, wherein at least one of the plurality of spatter removal elements comprises a spatter removal brush and/or rake element.

6. The build material application device of claim 1, wherein at least one of the plurality of spatter removal elements comprises a spatter removal blowing and/or sucking element.

7. The build material application device of claim 1, wherein at least one of the plurality of spatter removal elements comprises a spatter removal vibrational element.

8. The build material application device of claim 1, wherein the base body comprises a longitudinal shape configured to be arranged in parallel relative to a build plane of the apparatus.

9. The build material application device of claim 1, wherein the first extension, the second extension, and/or the third extension are disposed in an angled arrangement relative to a build plane of the apparatus.

10. The build material application device of claim 9, wherein the angled arrangement comprises a substantially perpendicular arrangement.

11. The build material application device of claim 1, wherein the support construction is moveably supported in at least one degree of freedom relative to a build plane of the apparatus.

12. The build material application device of claim 1, wherein each of the first extension, the second extension, and the third extension are each moveably supported relative to the base body and/or each other in at least one degree of freedom.

13. A method for removing spatters from a layer of build material in a build plane of an apparatus for additively manufacturing a three-dimensional object, the method comprising:

applying an amount of build material in a build plane by at least one build material application element;

applying successive irradiation to at least partially consolidate at least one layer of build material; and, removing spatters present in the least one layer of build material via a plurality of spatter removal elements supported by a supporting construction, wherein the supporting construction comprises:

a base body;

a first supporting site comprising a first extension extending from the base body and supporting the at least one build material application element;

a second supporting site comprising a second extension extending from the base body and supporting a first one of the plurality of spatter removal elements; and a third extension extending off the base body and supporting a second one of the plurality of spatter removal elements;

wherein, at least one of the first extension, second extension and third extension are moveably supported relative to the base body and/or each other in at least one rotatory degree of freedom into a non-operating state wherein the at least one of the first extension, second extension and third extension do not contact the plurality of spatter removal elements.

* * * * *